United States Patent
Roh et al.

(10) Patent No.: US 6,644,046 B2
(45) Date of Patent: Nov. 11, 2003

(54) REFRIGERATOR AND METHOD FOR OPERATING THE SAME

(75) Inventors: Young Hoon Roh, Seoul (KR); Jung Ho Kim, Kyungki-do (KR); Jin Chul Cho, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/179,846

(22) Filed: Jun. 26, 2002

(65) Prior Publication Data

US 2003/0167782 A1 Sep. 11, 2003

(30) Foreign Application Priority Data

Mar. 6, 2002 (KR) .......................... 2002-12013

(51) Int. Cl.⁷ .......................... F25B 49/00; G05D 23/00
(52) U.S. Cl. .......................... 62/126; 236/94
(58) Field of Search .......................... 62/126, 127, 129, 62/246; 340/585; 236/94

(56) References Cited

U.S. PATENT DOCUMENTS

| | | | | |
|---|---|---|---|---|
| 6,405,544 B2 | * | 6/2002 | Hiraoka et al. | 62/127 |
| 6,442,952 B2 | * | 9/2002 | Roh et al. | 62/127 |
| 6,453,687 B2 | * | 9/2002 | Sharood et al. | 62/127 |
| 6,483,695 B1 | * | 11/2002 | Hartstein | 361/680 |
| 6,526,766 B1 | * | 3/2003 | Hiraoka et al. | 62/125 |
| 2001/0054291 A1 | * | 12/2001 | Roh et al. | 62/126 |
| 2002/0011072 A1 | * | 1/2002 | Hiraoka et al. | 62/126 |
| 2002/0029575 A1 | * | 3/2002 | Okamoto | 62/125 |
| 2002/0066279 A1 | * | 6/2002 | Kiyomatsu | 62/125 |
| 2002/0189267 A1 | * | 12/2002 | Singh et al. | 62/126 |
| 2003/0005710 A1 | * | 1/2003 | Singh et al. | 62/129 |
| 2003/0018975 A1 | * | 1/2003 | Stone | 725/105 |

* cited by examiner

*Primary Examiner*—Marc Norman
(74) *Attorney, Agent, or Firm*—Greenblum & Bernstein, P.L.C.

(57) ABSTRACT

A refrigerator and a method for operating the same. The refrigerator comprises a single media controller installed on a single board together with a refrigerator microcomputer, which controls the entire operation of the refrigerator, for not only displaying information regarding internal environments of the refrigerator on a display unit installed on the outer surface of the refrigerator, but also connecting the refrigerator to an external network, such as the Internet, to enable a user to access the Internet through the refrigerator. Therefore, the refrigerator can be reduced in its assembling time and manufacturing cost and be increased in its assembling efficiency.

11 Claims, 4 Drawing Sheets

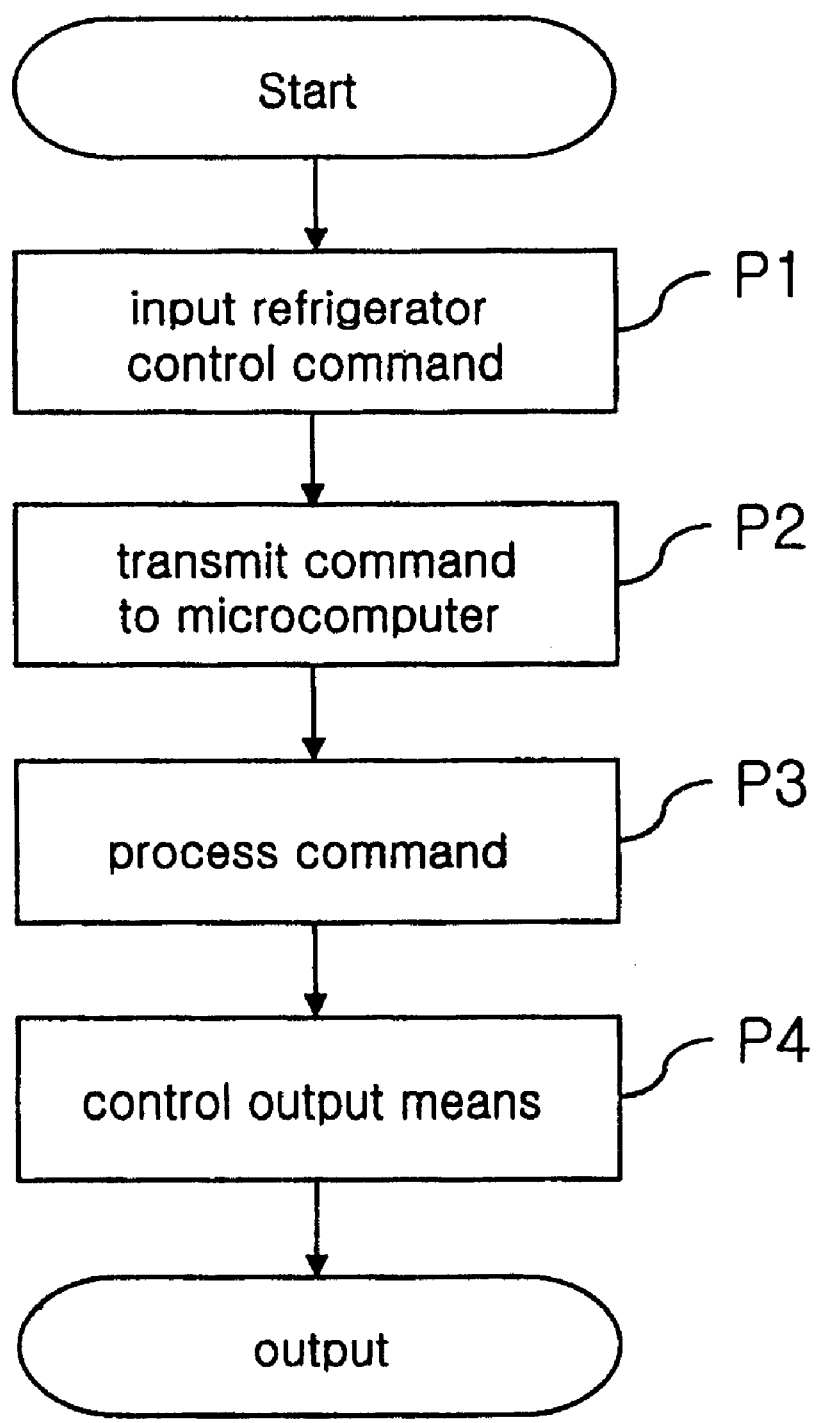

REFRIGERATOR AND METHOD FOR OPERATING THE SAME

BACKGROUND OF THE INVENTION

1. Field of the Invention

The present invention relates to a refrigerator which has a display unit installed on its outer surface for displaying information regarding internal environments of the refrigerator and enabling a user to use the Internet, and more particularly to a refrigerator manufactured to comprise a single controller for performing a multimedia function of the refrigerator.

2. Description of the Related Art

A refrigerator has recently been increasingly widely used in which a display unit with a liquid crystal display (LCD) screen is mounted on the outer surface, typically the front surface, of the refrigerator to display information regarding internal refrigerating and freezing environments of the refrigerator.

Particularly, in such a refrigerator, the display unit is configured to not only display the information regarding the internal environments of the refrigerator, but also enable a user to input control commands. As a result, the user can simply operate the refrigerator through the display unit according to his/her intention and then confirm the operation results through the display unit. Namely, when the display unit installed in the refrigerator functions as a touch pad, the user can input a desired control command into the refrigerator through a control command input window executed on the display unit.

Further, in the case where the refrigerator is constructed to be connectable to an external network such as the Internet, the user can use the Internet through the refrigerator with an Internet browser run in the display unit. Also, the user can shoot a specific image through a camera installed in an upper portion of the display unit, and record his/her voice through a microphone and output the recorded voice through a speaker.

For execution of the various media functions grafted into the refrigerator, as mentioned above, the refrigerator comprises, as shown in FIG. 1, a microcomputer 1 for controlling the entire operation of the refrigerator and internal refrigerating and freezing environments of the refrigerator, a video controller 2 connected to the microcomputer 1 for controlling the camera, an audio controller 3 connected to the microcomputer 1 for controlling the microphone and speaker, and an Internet controller 4 for connecting the refrigerator to the external network.

However, in the refrigerator with the construction as shown in FIG. 1, the media controllers, such as the video controller and audio controller, must be each connected to the microcomputer of the refrigerator in a similar manner to their connections to a general desktop personal computer (PC), thereby making an assembling process of the refrigerator complicated and increasing parts costs required in manufacturing the refrigerator.

SUMMARY OF THE INVENTION

Therefore, the present invention has been made in view of the above problems, and it is an object of the present invention to provide a refrigerator having a multimedia function, wherein an exclusive single media controller is provided to perform the multimedia function, thereby making an assembling process of the refrigerator simple and suppressing an increase in parts costs required in manufacturing the refrigerator.

In accordance with one aspect of the present invention, the above and other objects can be accomplished by the provision of a refrigerator comprising: a microcomputer for controlling refrigerating and freezing environments of the refrigerator; a display unit for displaying information regarding an operating state of the refrigerator; and a media controller installed on a single board along with the microcomputer for processing the operating state information of the refrigerator to display it on the display unit, the media controller being connectable to an external network.

In accordance with another aspect of the present invention, there is provided a method for operating a refrigerator, comprising the steps of: a) inputting a multimedia associated command to a microcomputer and then transmitting the inputted command to a media controller, the microcomputer controlling the entire operation of the refrigerator, the media controller controlling a multimedia function of the refrigerator; b) allowing the media controller to process the multimedia associated command transmitted at the step a); and c) allowing the media controller to control output means in accordance with results of the process at the step b).

In accordance with yet another aspect of the present invention, there is provided a method for operating a refrigerator, comprising the steps of: a) inputting a refrigerator control command to a media controller and then transmitting the inputted command to a microcomputer, the media controller controlling a multimedia function of the refrigerator, the microcomputer controlling the entire operation of the refrigerator; and b) allowing the microcomputer to manage and control the refrigerator in response to the command transmitted at the step a).

BRIEF DESCRIPTION OF THE DRAWINGS

The above and other objects, features and other advantages of the present invention will be more clearly understood from the following detailed description taken in conjunction with the accompanying drawings, in which:

FIG. 6 is a flow chart illustrating an alternative embodiment of a refrigerator operating method in accordance with the present invention.

DESCRIPTION OF THE PREFERRED EMBODIMENTS

Figure 1:
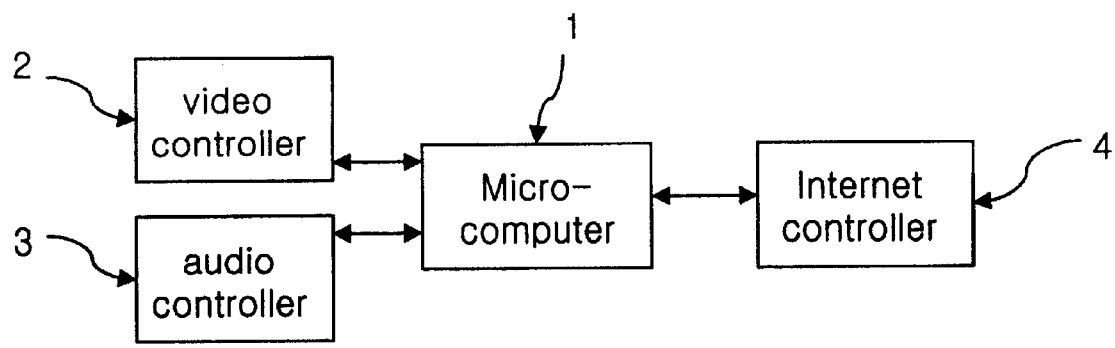
FIG. 1 is a block diagram showing the construction of a conventional refrigerator having a plurality of controllers.
Figure 2:
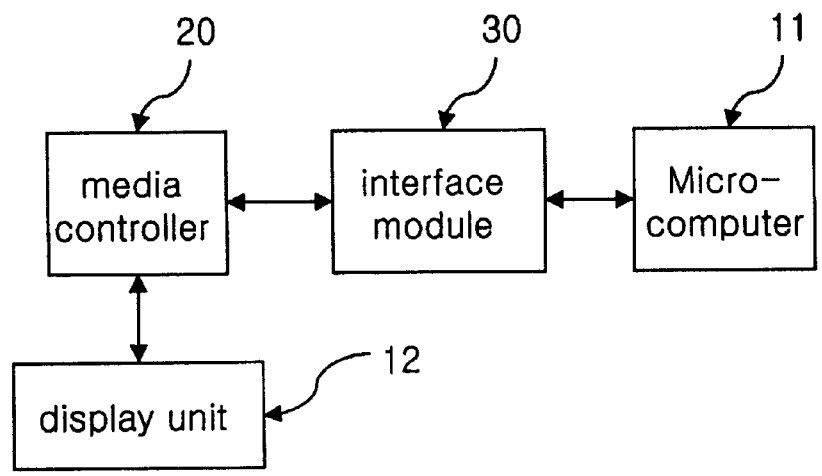
FIG. 2 is a block diagram showing the construction of a refrigerator having a single media controller in accordance with the present invention.

With reference to FIG. 2, there is shown in block form the construction of a refrigerator in accordance with the present invention. As shown in this drawing, the refrigerator comprises a microcomputer 11 for controlling the entire operation of the refrigerator and internal refrigerating and freezing environments of the refrigerator, a display unit 12 for displaying information regarding the internal environments of the refrigerator controlled by the microcomputer 11, and a media controller 20 for processing an output signal from the microcomputer 11 to display the information regarding the internal environments of the refrigerator controlled by the microcomputer 11 through the display unit 12. The media controller 20 is also connectable to an external network.

Preferably, the media controller 20 is a single media control module capable of not only controlling an image displayed on the display unit 12, but also performing the entire media function of the refrigerator. Further, the media controller 20 is installed in the same board along with the microcomputer 11, resulting in reductions in the number of parts and the size of multimedia associated equipment contained in the refrigerator.

Figure 3:
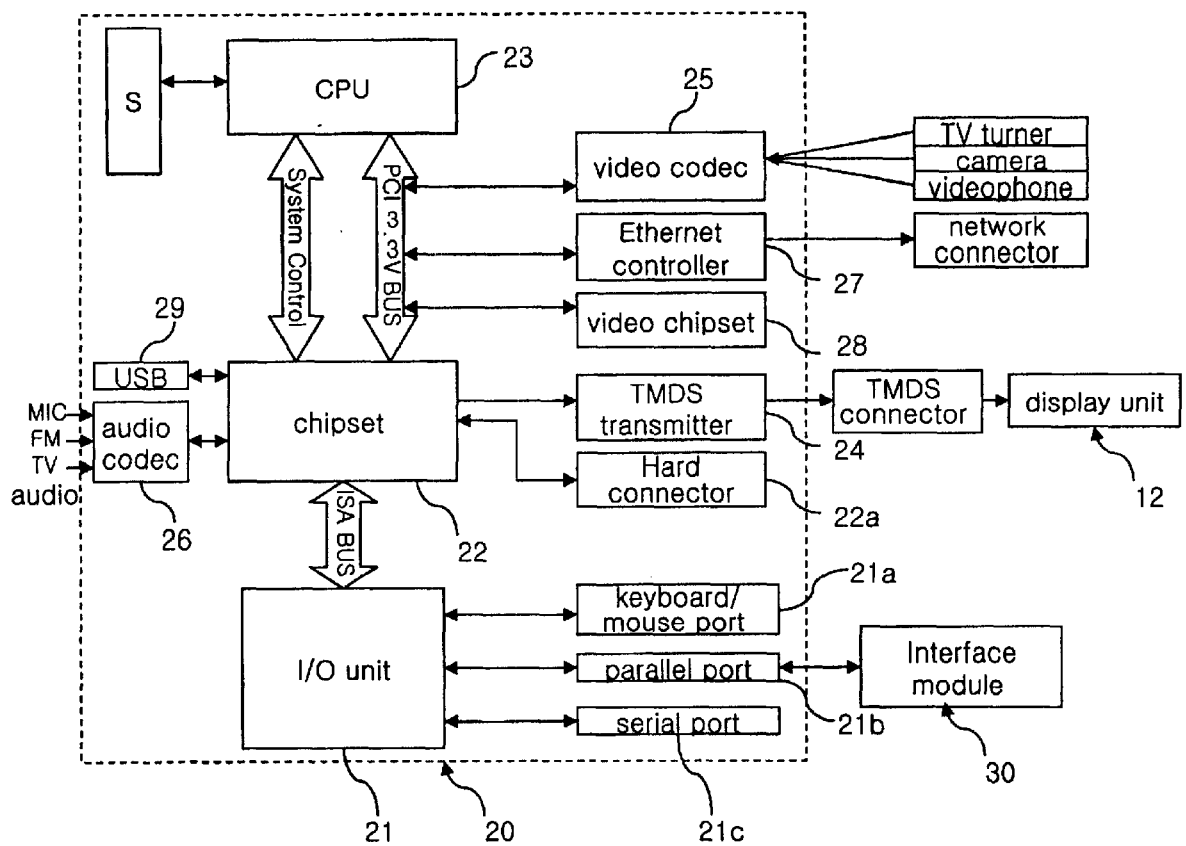
FIG. 3 is a detailed block diagram of the media controller in FIG. 2;.

FIG. 3 is a detailed block diagram of the media controller 20 in FIG. 2.

As shown in FIG. 3, the media controller 20 includes an input/output (I/O) unit 21 for inputting and outputting signals from/to the microcomputer 11, a chipset 22 for controlling the signals inputted and outputted through the I/O unit 21, and a central processing-unit (CPU) 23 for processing the signals controlled by the chipset 22 such that they are displayable on the display unit 12.

A signal processed to be displayable by the CPU 23 and sent to the chipset 22 is displayed on the display unit 12 through a TMDS transmitter 24 and a TMDS connector. The TMDS is a signal processing method for displaying an image on the display unit by processing the image using a potential difference between two adjacent ones of a plurality of pixel lines of the image such that it can be insensitive to noise.

The media controller 20 further includes a video codec 25 for coding and decoding a video signal to be transmitted from a camera, videophone or TV turner installed on the outer surface of the refrigerator to the CPU 23, and an audio codec 26 for coding and decoding an audio signal from a microphone, FM radio or TV audio installed on the outer surface of the refrigerator. The video codec 25 is connected to the chipset 22. The chipset 22 assigns priorities to all signals inputted thereto such that they can be appropriately processed by the CPU 23. Alternatively, the chipset 22 may assign memory locations to the inputted signals such that they can be appropriately processed by the media controller 20.

The media controller 20 further includes an Ethernet controller 27 connected to a network connector for connecting the media controller 20 to an external network such as the Internet. The Ethernet controller 27 is adapted to convert the format of a signal to be transmitted from the media controller 20 to the external network into that appropriate to an Ethernet standard. The Ethernet controller 27 is also adapted to convert the format of a signal received over the external network into that appropriate to a standard of the media controller 20. The Ethernet controller 27 is further adapted to maintain the connection between the refrigerator and the external network. Signals transmitted and received through the Ethernet controller 27 are processed by the CPU 23.

The I/O unit 21 is connected to a keyboard/mouse port 21a, a parallel port 21b and three serial ports 21c. The keyboard/mouse port 21a acts to input a command from a keyboard or mouse to the I/O unit 21. The parallel port 21b acts to transmit and receive signals to/from the refrigerator microcomputer 11. The microcomputer 11 and the media controller 20 are interconnected via the parallel port 21b. In this regard, the refrigerator further comprises an interface module 30 connected between the media controller 20 and the microcomputer 11 for converting the formats of signals transmitted and received therebetween into those appropriate to standards of the media controller 20 and microcomputer 11, respectively.

A signal from a touch pad of the refrigerator is inputted to the I/O unit 21 through any one of the serial ports 21c. On the other hand, the refrigerator according to the present invention may not comprise the Ethernet controller 27 or not be connected to the. Internet through the Ethernet. In this case, the media controller according to the present invention may be connected to the external network via an external modem. A signal from the external modem or other home networking equipment is inputted to the I/O unit 21 through any one of the serial ports 21c.

The media controller 20 further includes a video chipset 28 for controlling a video signal. The chipset 22 includes a USB port 29 for connecting the refrigerator to a home network under control of a serviceman. The chipset 22 further includes a hard connector 22a connected to a hard disk according to a UDMA standard. The UDMA standard may be, for example, a ltra DMA which is a protocol developed by Quantum Inc., a manufacturer of hard disk drives, and Intel Corporation, a manufacturer of chipsets supporting computer bus technologies, for transferring data between a hard disk drive and a RAM over a bus.

The media controller further includes a 168-pin socket S to which an SDRAM is mountable. The CPU 23 can store desired information in the SDRAM mounted to the socket S during its computing operation.

Figure 4:
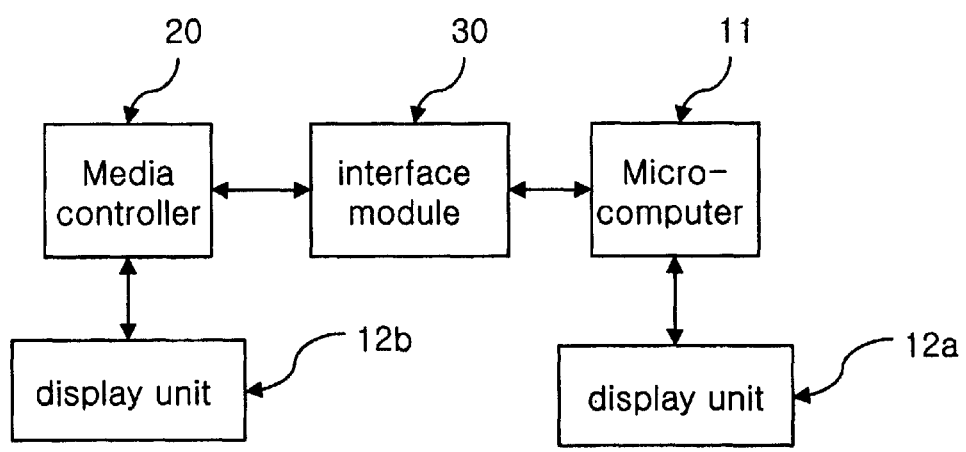
FIG. 4 is a block diagram showing a two-way communication configuration based on the media controller of FIG. 3 and a microcomputer in FIG. 2.

FIG. 4 shows a two-way communication configuration according to the present invention. As shown in this drawing, the two-way communication configuration comprises the media controller 20, the refrigerator microcomputer 11, the interface module 30 connected between the media controller 20 and the microcomputer 11, and display units 12a and 12b connected respectively to the microcomputer 11 and media controller 20.

The media controller 20 and the refrigerator microcomputer 11 can transmit and receive signals via the interface module 30 in a two-way manner. As a result, a signal inputted to the display unit 12b, which functions as a touch pad connected to the media controller 20, can be transmitted to the microcomputer 11.

In a general refrigerator, the display unit 12b displays only a signal that the refrigerator microcomputer 11 transmits to the media controller 20 in response to a command inputted through the display unit 12a connected thereto. However, in the present refrigerator, the media controller 20 and the microcomputer 11 bi-directionally transmit and receive signals via the parallel port 21b and interface module 30. As a result, the microcomputer 11 can perform a control operation in response to a command inputted through the display unit 12b connected to the media controller 20. A bi-directional buffer is preferably connected between the media controller 20 and the microcomputer 11 to enable the two-way communication therebetween.

Figure 5:
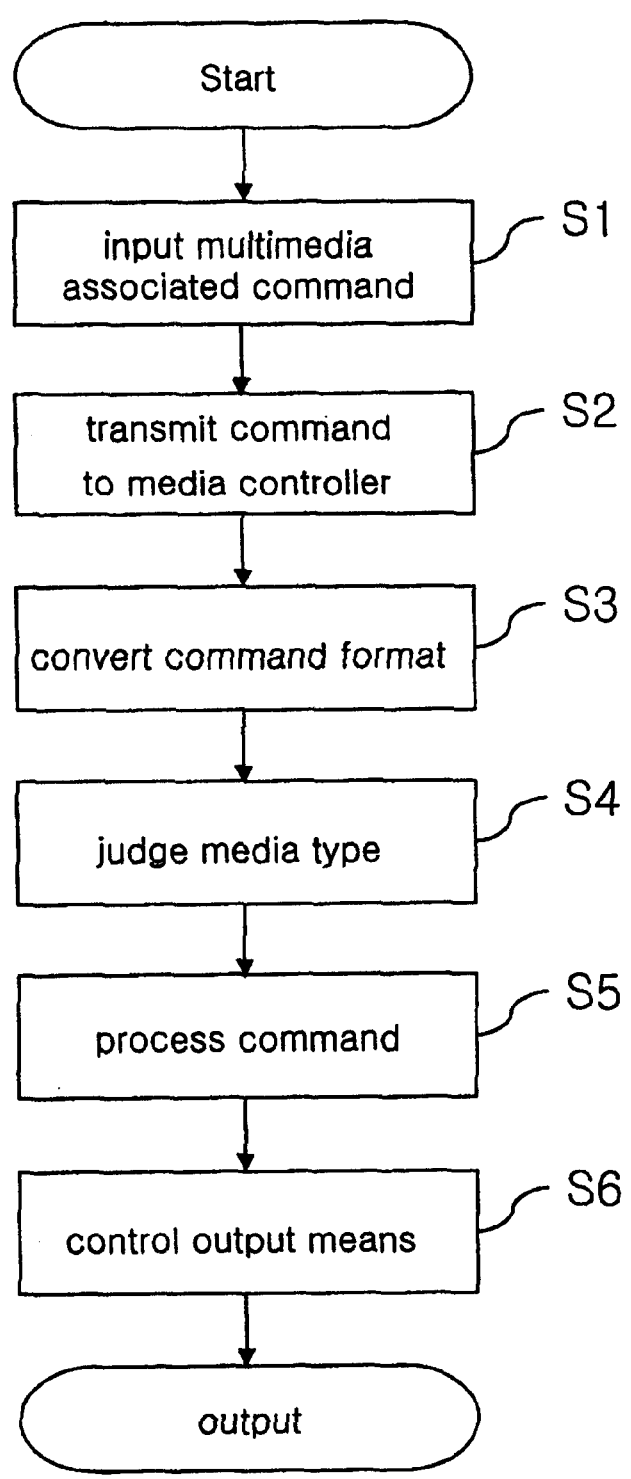
FIG. 5 is a flow chart illustrating a preferred embodiment of a refrigerator operating method in accordance with the present invention.

FIG. 5 is a flow chart illustrating a preferred embodiment of a refrigerator operating method in accordance with the present invention, wherein a multimedia associated command is inputted through input means connected to a microcomputer.

A multimedia associated command is inputted through a touch pad connected to a microcomputer which controls the entire operation of a refrigerator (S1), and then transmitted to a media controller which controls a multimedia function of the refrigerator (S2).

The format of the multimedia associated command transmitted at the above step S2 is converted into. that appropriate to a standard of the media controller through an interface module (S3), and the media controller judges a media type corresponding, to the format-converted multimedia associated command (S4). The media type may be, for example, a video, audio or network. The multimedia associated command is transmitted to a video codec, audio codec or Ethernet controller so that a corresponding media function can be performed thereby (S5).

Thereafter, the media controller controls output means corresponding to the media type judged at the above step S4 (S6). The output means may be, for example, a display unit in which a video signal output display and an audio signal output speaker are integrated.

FIG. 6 is a flow chart illustrating an alternative embodiment of a refrigerator operating method in accordance with the present invention, wherein a refrigerator control command is inputted through input mean s connected to a media controller.

A refrigerator control command is inputted through a keyboard or mouse connected directly to the media controller (P1) and then transmitted to a microcomputer via a bi-directional buffer connected between the media controller and the microcomputer (P2).

The microcomputer manages and controls a refrigerator in response to the command transmitted at the above step P2 (P3), and then outputs the results of the refrigerator management and control through the output means connected thereto (P4).

Accordingly, in the first and second embodiments of the present invention, commands can be inputted through the input means connected directly to the media controller, such as the mouse or keyboard, as well as the input means connected to the microcomputer, such as the touch pad. Further, commands can be bi-directionally transferred via the bi-directional buffer connected between the media controller and the microcomputer.

As apparent from the above description, the present invention provides a refrigerator wherein a single media controller is installed on a single board together with a refrigerator microcomputer, which controls the entire operation of the refrigerator, to not only display information regarding internal environments of the refrigerator on a display unit installed on the outer surface of the refrigerator, but also connect the refrigerator to an external network, such as the Internet, to enable a user to access the Internet through the refrigerator. Therefore, the present invention has the effect of reducing an assembling time and manufacturing cost of the refrigerator and increasing an assembling efficiency of the refrigerator.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A refrigerator comprising:
   a microcomputer that controls refrigerating and freezing environments of said refrigerator;
   a display unit that displays information regarding an operating state of said refrigerator;
   a media controller, connectable to an external network, that processes the operating state information for display on said display unit, said media controller and said microcomputer being installed on a single board;
   an input/output unit that inputs signals to and outputs signals from said microcomputer;
   a chipset that controls the input and output signals; and
   a central processing unit that processes the signals controlled by the chipset for display on said display unit.

2. The refrigerator as set forth in claim 1, further comprising an interface module, connected between said media controller and said microcomputer, that converts formats of signals transmitted between said media controller and said microcomputer into formats compatible with said media controller and said microcomputer, respectively.

3. The refrigerator as set forth in claim 1, wherein said media controller further includes a video codec that at least one of codes and decodes a video signal transmitted from a camera to said central processing unit.

4. The refrigerator as set forth in claim 1, wherein said media controller further includes an Ethernet controller, connected to said external networks that connects said media controller to said external network, said central processing unit processing signals transmitted and received through said Ethernet controller.

5. The refrigerator as set forth in claim 1, wherein said media controller further includes an audio codec that at least one of codes and decodes an audio signal from a microphone, said audio codec being connected to said chipset.

6. The refrigerator as set forth in claim 1, wherein said media controller further includes a parallel port that transmits and receives signals to and from said microcomputer, said parallel port being connected to said input/output port.

7. The refrigerator as set forth in claim 1, wherein said media controller further includes a plurality of serial ports, connected to said input/output unit, that input additional signals to said input/output unit.

8. The refrigerator as set forth in claim 1, wherein said chipset assigns priorities to the signals inputted through said input/output unit and outputs the signals processed by said central processing unit to said display unit.

9. A method for operating a refrigerator, comprising:
   receiving a multimedia associated command at a microcomputer and transmitting the multimedia associated command to a media controller, said microcomputer controlling operation of said refrigerator, and said media controller controlling a multimedia function of said refrigerator;
   processing the multimedia associated command at said media controller, the processing comprising converting a format of the multimedia associated command into a format of said media controller and determining a media type of the format-converted multimedia associated command; and
   controlling output of said media controller in accordance with results of the processing.

10. The method as set forth in claim 9, wherein the output of said media controller is controlled in accordance with the determined media type.

11. A method for operating a refrigerator, comprising:
   inputting a refrigerator control command to a media controller and transmitting the inputted command to a microcomputer via a bi-directional buffer, said media controller controlling a multimedia function of said refrigerator, said microcomputer controlling operation of said refrigerator; and
   managing and controlling said refrigerator by said microcomputer in response to the transmitted command.

* * * * *

UNITED STATES PATENT AND TRADEMARK OFFICE
CERTIFICATE OF CORRECTION

PATENT NO. : 6,644,046 B2
DATED : November 11, 2003
INVENTOR(S) : Y. H. Roh et al.

It is certified that error appears in the above-identified patent and that said Letters Patent is hereby corrected as shown below:

Column 6,
Line 16, "networks" should be -- network --.

Signed and Sealed this

Seventh Day of September, 2004

JON W. DUDAS
*Director of the United States Patent and Trademark Office*